UNITED STATES PATENT OFFICE

HOWARD WILLIAM R. BIBBS, OF FOREST HILLS, NEW YORK, ASSIGNOR TO OXWELD ACETYLENE COMPANY, A CORPORATION OF WEST VIRGINIA

WELDING ROD

No Drawing.    Application filed March 14, 1931.   Serial No. 522,785.

The invention relates to welding rods which are coated with an electrically conductive flux- or slag-forming material. The coating is effective in stabilizing the arc and improving the quality of the molten metal, such as iron and its alloys deposited in using the rods to make welds. The rods are especially useful in metallic arc welding, both manual and automatic, but they may be used in connection with other kinds of welding, such as welding with flames.

The metal of welding rods is heated to extremely high temperatures during transfer through the arc or the flame to the parts to be welded. During the actual transfer of the metal and while the deposit is still molten, the metal is exposed to the surrounding gases of the atmosphere. Unless the hot metal is protected these gases react with the metal through solution or by the formation of compounds, such as oxides and nitrides. During cooling some dissolved gases may be rejected with effervescence and the production of blow-holes. Fixed compounds of oxygen and nitrogen remain largely as aggregates or as dissolved non-metallic material. These materials exert a deleterious influence on the physical properties of the weld metal.

I have provided a coating for the rods which overcomes these defects. Some of the constituents of the coating vaporize and protect the metal during its transfer through the arc, and a protective deposit is formed on the deposited metal. It is advantageous to have an adherent non-friable coating which will not flake off by scraping, in handling or by moderate bending of the rods. For use in automatic welding machines it is advantageous to have a coating which is electrically conducting so that current can be supplied through the weld rod to the arc without removing parts of the coating, as by cutting through the coating in order to provide a good electrical contact.

It is among the objects of the invention to provide an adherent, non-friable coating with high electrical conductivity which is uniformly electrically conductive so that current can be supplied to the arc through the coating. Another object of the invention is to provide a coating which efficiently protects the vaporized metal from the deleterious influence of the ambient gases of the atmosphere, especially nitrogen. Another object of my invention is to provide a coating which forms a fluid slag, which readily wets the molten metal and which offers little or no adherence when the metal is cold.

According to the invention the welding rod is coated with a composition containing finely divided carbon, such as graphite, finely divided zirconium, a metal constituent which forms acidic oxides, also an alkaline earth metal which may be present in the form of an alkaline earth compound or as a constituent of an alloy. In preparing the coating, the constituents are intimately mixed and a vehicle is added so that the mixture will form an adherent coating on the rod and have a considerable degree of coherence.

As an illustration of the invention, a coating composition was made by mixing powdered silicon-zirconium alloy, powdered dry quick lime, and a pasty composition of colloidal artificial graphite suspended in water, known commercially as "Aquadag". The silicon-zirconium alloy contained about 35% zirconium with the remainder silicon except about 5% iron. The alloy was powdered and passed through a screen having 200 meshes to the inch. The lime was powdered to about the same fineness as the silicon-zirconium alloy. Silicon-zirconium alloy powder weighing 22.9 grams was mixed with 2.2 grams of the dry lime, the resultant mixture was added to and thoroughly mixed with a quantity of "Aquadag" which contained about 1.5 grams of carbon. The mixture was thinned with water to a thick creamy consistency, applied to the rod with a brush as a thin coating and allowed to dry in air. The dried coating was uniformly electrically conductive and it had the appearance of a thin, dull, black paint. It had sufficient cohesion, adherence, non-friability and non-brittleness to permit moderate bending of the rod. Handling, moderate rolling and moderate striking against other objects did not materially damage the coating. The coating contained about 30.1% zirconium, 51.7% silicon, 5.6% carbon and 10.6% calcium hydroxide, equivalent to about 8% CaO.

Carbon in the form of deflocculated graphite suspended in water, known commercially as "Aquadag" is a convenient form of carbon. The zirconium may be used in the form of an alloy with a metal which gives an acidic oxide, for example silicon-zirconium alloy, manganese-zirconium alloy, nickel-zirconium alloy or manganese-silicon-zirconium alloy, but the metallic zirconium may be present in other forms. An alkaline earth compound, such as lime is desirable, but the alkaline earth metal may be present as an alloy. For example calcium may be present as calcium alloyed with zirconium and/or with the metal which produces an acidic oxide, such as an alloy of silicon, zirconium and calcium. It is not essential that the alkaline earth metal compound shall be present as the hydroxide. Other alkaline earth metal compounds can be used.

Water is desirable as the volatile vehicle in the coating material but other volatile vehicles may be used. Vehicles which partially volatilize leaving a residue which does not materially affect the conductivity of the dried coating may also be used. The carbon particles must be small and the quantity of carbon must be sufficient to provide a conductive coating on or around the granular non-conductive materials which may be present. Deflocculation of the graphite is not essential. Other solid constituents of the coatings are desirably finely divided. Particles which will pass through a screen having about 50 meshes to the inch and all smaller sizes are referred to in the specification and claims as finely divided particles. The smallest particles obtainable can be used.

The proportions of the constituents can be broadly varied. Since one of the main functions of carbon is to improve the conductivity as well as the strength and adhesion of the coating, small amounts, for example about 2.0% are sufficient but larger amounts up to about 10% can be used. About 25% to 65% zirconium and 20% to 60% silicon are desired. Excellent results are obtained when the ratio of silicon or its equivalent to zirconium is about 45 to 55 parts. The calcium may range from about 2.0% to about 15.0%. If the calcium is present as a non-alloy compound the sum of the compound and carbon should be about 5% to 25%, the remainder of the coating being silicon or its equivalent, zirconium and non-deleterious metals, such as iron.

The protective action of coatings made in accordance with my invention is illustrated by the following experiment. The coating described in the above illustration was applied to a rod. The rod was composed of iron containing 0.13% carbon, 0.86% manganese, 0.37% silicon and small fractional percentages of impurities. A weld was made with this rod by the electric welding process, using the rod as one terminal of the arc. Another weld was made by using an uncoated rod of the same composition under identical current conditions. Analysis of the resultant deposits showed that about three times as much carbon, and one and one-half times as much manganese and silicon were burned out of the metal of the rod in producing the weld with the uncoated rod. The weld metal produced by the coated rod was practically free from oxides and nitrides. These impurities were abundant in the welds produced by the uncoated rod. The ductility of the weld produced by the coated rod was higher. The strength of the weld produced by the coated rod when it had been machined to the thickness of the plates which were welded together, exceeded the strength of the plates and of the weld produced by the uncoated rod. With the coated rod the slag which covered the deposited metal was larger in volume, more viscous, and had much greater wetting properties for molten metal than that produced by the use of the uncoated rod. Upon cooling, most of the slag produced by the coated rod loosened itself from the weld, the remainder being readily brushed off. The presence of nitrogen was often noticeable from a yellow coating next to the metal. The slags were unusually high in nitrogen, some analyses showing about 2%. The slag resulting from welding with the uncoated rod adhered to the molten metal so rigorously that persistent hammering was required to remove it.

The heavier slag which was formed in using the coated rod retarded cooling of the deposited metal and protected the surface from too rapid chilling. The deposit produced by the uncoated rod was practically exposed to the atmosphere during cooling. The cooling took place so rapidly at the surface of the metal that escaping gases were checked before they could escape from the shell of the chilled metal. This resulted in the production of blow-holes in the deposits and the formation of a brittle top layer of weld metal due to exposure to gases.

During the welding a distinct crater was formed in the coated rod. On a rod which was 3/16ths of an inch in diameter the crater extended in some instances 3/16ths of an inch back from the outer rim of the coating. This was due to a high-melting shell of zirconium alloy which was formed at the end of the rod under the influence of the extreme heat of the electric arc. The lower melting material in the core of the rod melted out before the alloy shell. The marginal substance comprising the coating which had a higher melting point was continuously vaporized as the core metal was deposited and it formed a sheath of protecting vapor around the core metal. This effectively shielded the core metal from contact with the gases of the atmosphere. With the uncoated rod no crater action was noticeable.

It was found that the arc produced by the coated rod was steadier and more easily controlled than arcs produced by uncoated rods. This action was so great that the polarity of the ro could be reversed at will with direct current and little or no difference in the welding characteristics of the rod was noticeable. It is my present belief that the intensely heated arc terminal in the crater of the coated rods together with the protecting vaporous atmosphere resulting from the coating has a benefical effect on the character and behavior of the arc as well as on the improved composition and physical characteristics of the deposited weld metal.

I claim:—

1. A metal welding rod having an electrically conductive coating which comprises about 2.0% to 10% carbon, about 25% to 65% zirconium, about 20% to 60% of a metal which forms an acidic oxide, and about 2.0% to 15% of an alkaline earth metal.

2. A metal welding rod having an electrically conductive coating which comprises about 2.0% to 10% carbon, about 25% to 65% zirconium, about 20% to 60% silicon, and about 2.0% to 15% of an alkaline earth metal.

3. A metal welding rod having an electrically conductive coating which comprises about 2.0% to 10% carbon, about 25% to 65% zirconium, about 20% to 60% of a metal which forms an acidic oxide, and about 2.0% to 15% of an alkaline earth oxide.

4. A metal welding rod having an electrically conductive coating which comprises carbon, about 25% to 60% zirconium, about 20% to 60% silicon, and about 2.0% to 15% alkaline earth oxide, the sum of the carbon and about 2.0% to 15% of an alkaline earth metal. the alkaline earth oxide aggregating about 5.0% to 25%.

5. A metal welding rod having an electrically conductive coating which comprises about 5.6% carbon, about 30% zirconium, about 51.7% silicon, and about 8% calcium oxide.

6. A metal welding rod having a non-friable, adhesive, electrically conductive coating which comprises carbon about 5.6%, zirconium about 30%, a metal which forms acetic oxides about 51.7%, and an alkaline earth compound about 8%, said constituents of the coating being finely divided and cohesively combined.

7. A metal welding rod having a non-friable, adhesive, electrically conductive coating which comprises graphite 2 to 10%, an alloy containing zirconium and a metal which forms acetic oxides 75 to 95% and an alkaline earth compound 2 to 15%, said constituents of the coating being finely divided, intimately mixed, and adhesively combined.

8. A metal welding rod having a non-friable, adhesive, electrically conductive coating which comprises an alloy containing zirconium and silicon in about the ratio 55 to 45 with the balance principally carbon and lime, the carbon being between about 2 and 10%.

9. A metal welding rod having an electrically conductive coating which comprises a finely divided alloy composed principally of zirconium and a metal which gives an acetic oxide 75 to 95%, graphite which is derived from deflocculated graphite 2 to 10% and an alkaline earth oxide 2 to 15%, the constituents of the coating being finely divided and intimately mixed.

10. A metal welding rod having a ferrous core and an electrically conductive coating thereon, said coating comprising carbon 2 to 10% with the balance an alloy which contains zirconium, a metal which gives an acetic oxide and an alkaline earth metal, the alkaline earth metal being between 2 and 10% of the total core.

11. A welding rod having a ferrous core and an electrically conductive coating thereon, said coating comprising carbon 2 to 10% and an alloy which contains zirconium and a metal which gives an acetic oxide 75 to 95% and an alkaline earth compound 5 to 15%.

In testimony whereof, I affix my signature.

HOWARD WM. R. BIERS.